United States Patent [19] [11] Patent Number: 4,911,469
Kawarasaki [45] Date of Patent: Mar. 27, 1990

[54] ACTIVELY CONTROLLED SUSPENSION SYSTEM WITH IMPROVED LAYOUT OF PRESSURE CONTROL VALVE

[75] Inventor: Yoshihiro Kawarasaki, Kanagawa, Japan

[73] Assignee: Nissan Motor Company, Limited, Yokohama, Japan

[21] Appl. No.: 327,460

[22] Filed: Mar. 22, 1989

[30] Foreign Application Priority Data

Mar. 30, 1988 [JP] Japan .............................. 63-42794[U]

[51] Int. Cl.⁴ ............................................. B60G 17/08
[52] U.S. Cl. .................................... 280/707; 280/714; 280/DIG. 1
[58] Field of Search ............... 280/840, 707, 709, 714, 280/DIG. 1; 180/41; 267/64.16

[56] References Cited

U.S. PATENT DOCUMENTS

| | | | |
|---|---|---|---|
| 1,522,243 | 1/1925 | Hughes | 280/DIG. 1 |
| 3,029,089 | 4/1962 | Nashman | 280/DIG. 1 |
| 3,124,368 | 3/1964 | Corley et al. | 280/DIG. 1 |
| 3,258,258 | 6/1966 | Hanna | 280/709 |
| 4,639,014 | 1/1987 | Tanaka et al. | 280/714 |
| 4,702,490 | 10/1987 | Yamaguchi et al. | 280/707 |
| 4,732,408 | 3/1988 | Ohlin | 280/714 |
| 4,819,771 | 4/1989 | Britze | 280/714 |
| 4,828,283 | 5/1989 | Ishii et al. | 280/707 |
| 4,834,419 | 5/1989 | Kazaki et al. | 280/707 |

Primary Examiner—Richard A. Bertsch
Attorney, Agent, or Firm—Foley & Lardner, Schwartz, Jeffery, Schwaab, Mack, Blumenthal & Evans

[57] ABSTRACT

An actively controlled suspension system arranges a pressure control valve so arranged as to longitudinally direct a valve bore in which a movable valve spool for establishing and blocking fluid communication between a fluid pressure source and a working chamber in a hydraulic cylinder, is disposed. The longitudinal force to be exerted on the vehicle body is smaller in comparison with the lateral and vertical force. Therefore, a force of spring for restricting movement of the valve spool can be minimized.

8 Claims, 3 Drawing Sheets

ACTIVELY CONTROLLED SUSPENSION SYSTEM WITH IMPROVED LAYOUT OF PRESSURE CONTROL VALVE

BACKGROUND OF THE INVENTION

1. Field of the Invention

The present invention relates generally to an actively controlled automotive suspension system for suppressing attitude change of a vehicular body and absorbing road shock for achieving both of riding comfort and driving stability. More specifically, the invention relates to an improvement in and relating to layout of components of the actively controlled suspension system for better performance.

2. Description of the Prior Art

Actively controlled suspension systems have been proposed as advanced technology for automotive suspension systems which can achieve both of riding comfort and driving stability. For example, U.S. Pat. No. 4,702,490, issued Oct. 27, 1987 discloses one of typical construction of the actively controlled hydraulic suspension system which includes a hydraulic cylinder defining a working chamber associated with a hydraulic pressure source. A pressure control valve is disposed within a hydraulic circuit connecting the hydraulic pressure source for adjusting the pressure in the working chamber for controlling suspension characteristics so that it may be adapted to a vehicle driving condition. The pressure control valve is electrically controlled valve position for introducing and draining the pressurized working fluid in the working chamber, by a control unit. The control unit receives a plurality of suspension control parameters, such as bounding and rebounding stroke between the vehicle body and a suspension member rotatably supporting a road wheel, longitudinal and/or lateral acceleration exerted on the vehicle body. The control unit performs anti-pitching, anti-rolling, suppression of bouncing and so forth.

In such the prior proposed actively controlled suspension system, the pressure control valve is constructed to include a valve spool for selectively establishing and blocking fluid communication between the working chamber of the hydraulic cylinder and the hydraulic pressure source. The valve spool is disposed within a valve bore for thrusting movement as activated by an electrically driven actuator, such as an electromagnetic solenoid. For such valve spool, acceleration exerted on the vehicle body tends to influence to unintentionally causing shifting the position for causing variation of the fluid pressure in the working chamber. This degrades precision level of suspension control.

For example, when the pressure control valve is arranged in a position to place the valve bore laterally and perpendicular to the longitudinal axis of the vehicle body. The valve spool is then movable in lateral direction with respect to the vehicle body. In such case, the valve spool can be subject lateral force during cornering. Assuming that the vehicle is running through the left-hand curve, and that the vehicle body is subject right-ward lateral force to cause right-hand rolling, the fluid pressure in the working fluid of the pressure control valves for right side suspension systems, i.e. right-front and right-rear suspension systems, are increased for suppressing lowering right side of the vehicle body. On the other hand, the fluid pressure in the working chamber in the hydraulic cylinder is decreased for avoiding excessive expansion of the working chamber for suppressing lifting up of the left side of the vehicle body. During such activity of the actively controlled suspension system, the right-ward force is exerted on respective valve spools of the pressure control valves to cause shifting. If this causes the pressure control valves for the right side suspension system to shift in a direction for decreasing the fluid pressure and the pressure control valves for the left side suspension system to shift in a direction for increasing the fluid pressure, vehicle body rolling is amplified.

In order to avoid influence of the external force for the pressure control valve, it may be necessary to restrict movement of the valve spool by means of a spring which has sufficient spring force. In such case, the spring force may be selected so as not to be overcome by the external force. This, on the other hand, serves as resistance against control force for positioning the valve spool for performing active suspension control. Since the valve position in the pressure control valve must have sufficiently high response characteristics so that the damping characteristics of the hydraulic cylinder can be timely adjusted. This requires big capacity of the actuator and big electric power to drive the actuator for causing quick shift of the valve spool. The bigger capacity of actuator and bigger spring force of the springs are necessarily bulky to prevent the pressure control valve to be satisfactorily compact to conveniently place on the vehicle body without causing interference with various vehicular components.

SUMMARY OF THE INVENTION

Therefore, it is an object of the invention to provide an actively controlled suspension system which can solve the problem in the prior art set forth above and can successfully avoid influence of the external force without requiring increasing of capacity and size of components of a pressure control valve.

Another object of the invention is to provide an actively controlled suspension system which can minimize influence of the external force by selecting layout of the pressure control valve in a vehicle body and thus achieves avoidance of influence of the external force without requiring greater restriction force for a valve spool of the pressure control valve.

In order to accomplish aforementioned and other objects, an actively controlled suspension system, according to the present invention, arranges a pressure control valve so arranged as to longitudinally direct a valve bore in which a movable valve spool for establishing and blocking fluid communication between a fluid pressure source and a working chamber in a hydraulic cylinder, is disposed. The longitudinal force to be exerted on the vehicle body is smaller in comparison with the lateral and vertical force. Therefore, a force of spring for restricting movement of the valve spool can be minimized.

According to one aspect of the invention, an actively controlled suspension system comprises:

a cylinder disposed between a vehicle body and a suspension member rotatably supporting a road wheel, and defining a working chamber filled with a working fluid and variable of volume according to relative displacement between the vehicle body;

a fluid circuit including a fluid pressure source unit for supplying a pressurized working fluid through the circuit;

a pressure control valve assembly disposed in the fluid circuit for controlling fluid pressure in the working chamber, the pressure control valve having a movable valve member thrustingly movable along a thrusting axis for increasing pressure in the working chamber in a first mode and for decreasing the pressure in the working chamber in a second mode;

a valve position control means, associated with the valve member, controlling position of the valve member selectively in the first and second mode, the valve position control means deriving the valve position detecting upon vehicle driving condition; and the pressure control valve assembly being so arranged on the vehicle body for directing the thrusting axis with respect to the axis of the vehicle body for minimizing external force transferred through the vehicle body and to be exerted on the movable valve member of the pressure control valve.

According to another aspect of the invention, an actively controlled suspension system comprises:

a cylinder disposed between a vehicle body and a suspension member rotatably supporting a road wheel, and defining a working chamber filled with a working fluid and variable of volume according to relative displacement between the vehicle body;

a fluid circuit including a fluid pressure source unit for supplying a pressurized working fluid through the circuit;

a pressure control valve assembly disposed in the fluid circuit for controlling fluid pressure in the working chamber, the pressure control valve having a movable valve member thrustingly movable along a thrusting axis for increasing pressure in the working chamber in a first mode and for decreasing the pressure in the working chamber in a second mode;

a valve position control means, associated with the valve member, controlling position of the valve member selectively in the first and second mode, the valve position control means deriving the valve position detecting upon vehicle driving condition; and the pressure control valve assembly being so arranged on the vehicle body for directing the thrusting axis parallel to a longitudinal axis of the vehicle body.

The pressure control valve assembly may comprise a housing defining a first port connected to a high pressure line in the fluid circuit for supply the pressurized fluid, a second port connected to a low pressure line in the fluid circuit for draining the pressurized fluid and a third port connected to the working chamber, the housing further defining a valve bore for receiving the valve spool in a fashion thrusting movable along the thrusting axis. The valve member thrusting movable across a predetermined neutral position, at which the valve member blocking fluid communication between the first port and the third port and between the second port and the third port. The pressure control valve assembly switching operation mode between the first mode and the second mode when the valve member moves across the neutral position.

Preferably, the valve position control means controls position of the valve member with respect to the neutral position for varying for adjusting flow restriction for fluid flow from the first port to the third port in the first mode and from the third port to the second port in the second mode.

According to a further aspect of the invention, an actively controlled suspension system comprises:

a cylinder disposed between a vehicle body and a suspension member rotatably supporting a road wheel, and defining a working chamber filled with a working fluid and variable of volume according to relative displacement between the vehicle body;

a fluid circuit including a fluid pressure source unit for supplying a pressurized working fluid through the circuit;

a pressure control valve assembly disposed in the fluid circuit for controlling fluid pressure in the working chamber, the pressure control valve having a movable valve member thrustingly movable along a thrusting axis for increasing pressure in the working chamber in a first mode and for decreasing the pressure in the working chamber in a second mode;

a valve position control means, associated with the valve member, controlling position of the valve member selectively in the first and second mode, the valve position control means deriving the valve position detecting upon vehicle driving condition; and the pressure control valve assembly being so arranged on the vehicle body for orienting the thrusting axis in a direction perpendicular to directions of rolling force to be exerted on the vehicle body.

According to a still further aspect of the invention, an actively controlled suspension system comprises:

a cylinder disposed between a vehicle body and a suspension member rotatably supporting a road wheel, and defining a working chamber filled with a working fluid and variable of volume according to relative displacement between the vehicle body;

a fluid circuit including a fluid pressure source unit for supplying a pressurized working fluid through the circuit;

a pressure control valve assembly disposed in the fluid circuit for controlling fluid pressure in the working chamber, the pressure control valve having a movable valve member thrustingly movable along a thrusting axis for increasing pressure in the working chamber in a first mode and for decreasing the pressure in the working chamber in a second mode;

a valve position control means, associated with the valve member, controlling position of the valve member selectively in the first and second mode, the valve position control means deriving the valve position detecting upon vehicle driving condition; and the pressure control valve assembly being so arranged on the vehicle body for orienting the thrusting axis perpendicular to a direction of vertical force for causing bounding and rebounding motion of the vehicle body.

BRIEF DESCRIPTION OF THE DRAWINGS

The present invention will be understood from the detailed description given herebelow and from the accompanying drawings of the preferred embodiments of the invention, which, however, should not be taken for limiting the invention to the specific embodiments, but are for explanation and understanding only.

In the drawings.

DESCRIPTION OF THE PREFERRED EMBODIMENT

Figure 1:
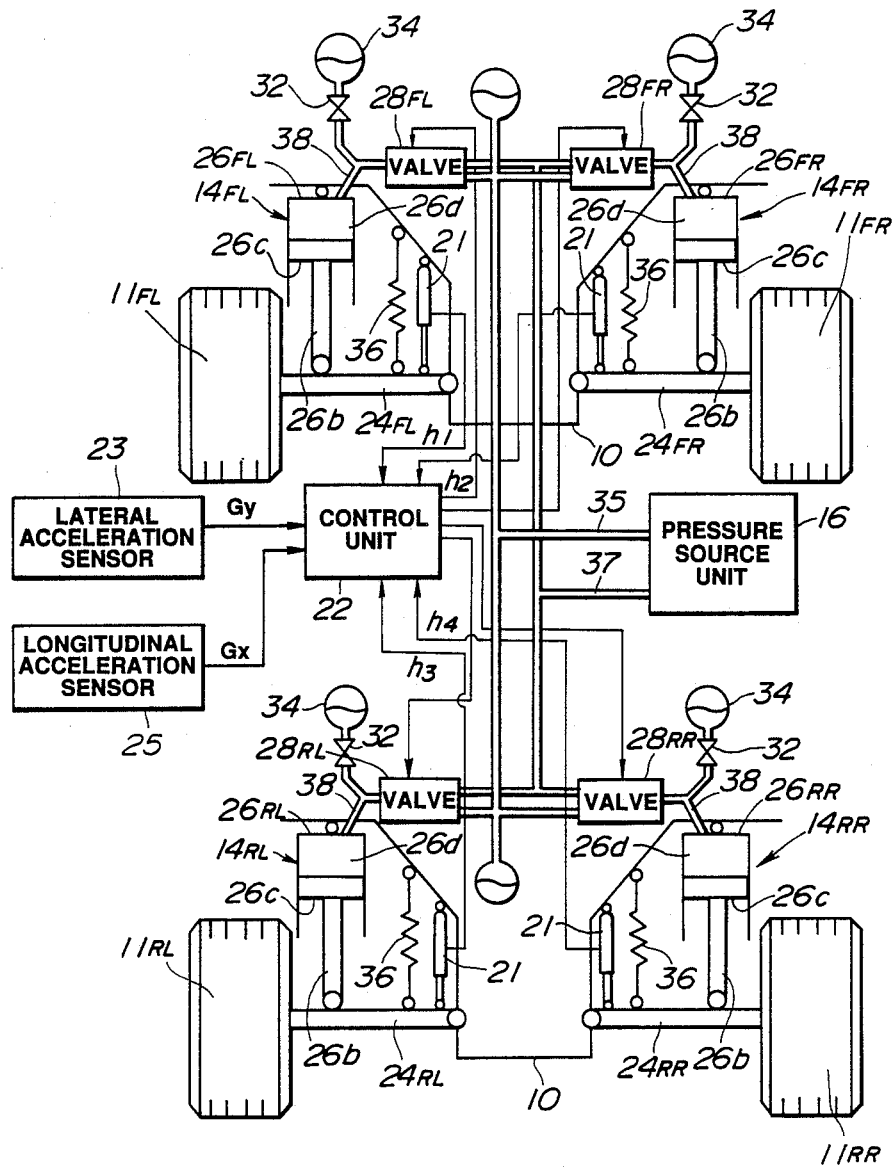
FIG. 1 is a diagrammatical illustration of the overall construction of the preferred embodiment of an actively controlled suspension system, according to the present invention, in which the preferred embodiment of a proportioning valve assembly is employed as a pressure control valve.

Referring now to the drawings, particularly to FIG. 1, the preferred embodiment of an actively controlled suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right. rear-left and rear-right wheels 11FL, 11FR, 11RL and 11RR. The suspension member will be hereafter represented by the reference numeral "24" as generally referred to. Similarly, the suspension mechanism as generally referred to will be hereafter represented by the reference numeral "14" Respective front-left, front-right, rear-left and rear-right suspension mechanisms 14FL, 14FR, 14RL and 14RR have hydraulic cylinders 26FL, 26FR, 26RL and 26RR which will be represented by the reference numeral "26" as generally referred to.

Each of the hydraulic cylinder 26 is disposed between the vehicular body 10 and the suspension member 24 to produce a damping force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d and a reference pressure chamber 26e. The working chamber 26d may be communicated with the reference pressure chamber 26e via an orifice formed through the piston for fluid communication therebetween in an substantially restricted amount. The piston 26c is connected to the associated one of suspension member 24 via a piston rod 26b. A suspension coil spring 36 employed in the shown type of the suspension system is not required a resilient force in a magnitude required in the ordinary suspension system and only required the resilient force necessary for maintaining the vehicular body about the suspension member.

The working chamber 26d of the hydraulic cylinder 26 is connected one of pressure control valves 28FL, 28FR, 28RL and 28RR via a pressure control line 38. The pressure control valve 28FL, 28FR, 28RL and 28RR will be hereafter represented by the reference numeral "28" as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Another pressure accumulator 18 is provided in the supply line 35 for accumulating the excessive pressure generated in the pressure source unit 16.

The pressure control valves 28 comprise, though it is not clearly shown in FIG. 1, electrically or electromagnetically operable actuators (reference is made to FIG. 2), such as a proportioning solenoids. The actuators are connected to a microprocessor based control unit 22. The control unit 22 is connected a plurality of vehicular height sensors 21 which are disposed in respectively associated suspension mechanism and designed for monitoring relative position of the vehicular body 10 and the relevant suspension member 24 to produce a vehicular height level indicative signals $h_1$, $h_2$, $h_3$ and $h_4$. The control unit 22 is also connected to a lateral acceleration sensor 23, a longitudinal acceleration sensor 25 and so forth to receive the vehicle driving condition indicative parameters. Based on these control parameters, including the height level indicative signals, a lateral acceleration indicative signal $G_y$ generated by the lateral acceleration sensor, a longitudinal acceleration indicative signal $G_x$ generated by the longitudinal acceleration sensor, and so forth, the control unit performs anti-rolling, anti-pitching and bouncing suppressive suspension controls.

While the specific sensors, such as the vehicle height sensors which comprise strike sensor, the lateral acceleration sensor 23 and the longitudinal acceleration sensor 25, it is possible to replace or add any other sensors which monitors vehicle driving parameter associated with the suspension control. For instance, the stroke sensors employed in the shown embodiment can be replaced with one or more vertical acceleration sensors. Similarly, the lateral acceleration sensor may be replaced with a steering angle sensor for monitoring steering behaviour for assuming lateral force to be exerted on the vehicular body. In the later case, the parameter indicative of the steering angular displacement may be used in combination of a vehicular speed data since vehicular speed may influence for rolling magnitude of the vehicle during steering operation.

Figure 2:
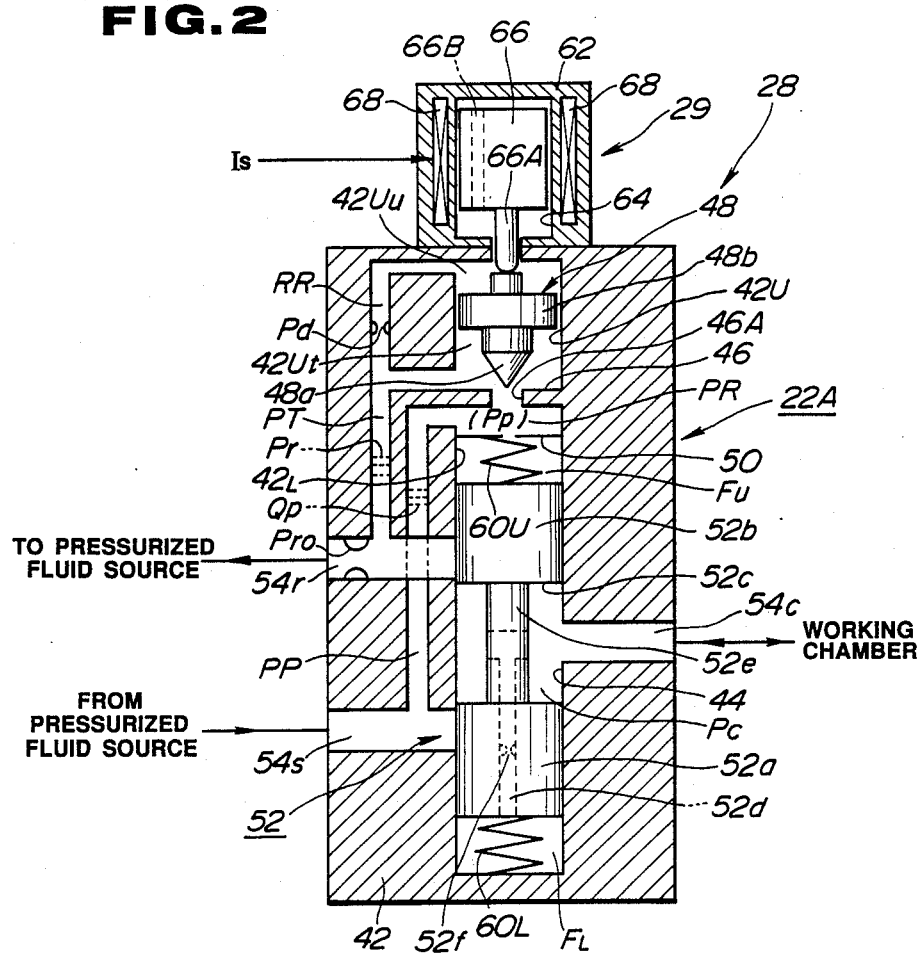
FIG. 2 is a sectional view of the preferred embodiment of the pressure control valve according to the present invention.

As shown in FIG. 2 in detail, the pressure control valve 28 comprises a proportioning valve assembly and is designed to be controlled by an electric current as a control signal supplied from the control unit 22 for varying valve position according to variation of the current value of the control signal. Generally, the pressure control valve 28 controls magnitude of introduction and draining of pressurized fluid into and from the working chamber 26d for adjusting the pressure in the working chamber. As will be appreciated, since the adjusted fluid pressure in the working fluid determines damping force to be created in response to relative displacement between the vehicle body 10 and the suspension member 24. Mode of the suspension mechanism is varied according to variation of the fluid pressure in the working chamber between a predetermined hardest mode to most soft mode.

In the construction of the pressure control valve shown in FIG. 2, the pressure control valve 28 includes a valve housing 42. The valve housing 42 defines a valve bore 44 which is separated in to a valve chamber 42L and a control chamber 42U by means of a partitioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment to each other across the communication path opening 46A. In parallel to a section of the partitioning wall 46 extending perpendicular to the axis of the valve chamber 42L and the control chamber 42U, a fixed orifice defining partitioning member 50 is provided. The partitioning member 50 defines a throttling orifice which is oriented substantially in alignment with the communication path opening 46A. The partitioning wall 46 and the partitioning member 50 are cooperative for defining a pilot chamber PR therebetween.

A valve spool 52 is thrustingly and slidingly disposed within the valve chamber 42L. The valve spool 52 defines an upper feedback chamber FU between the tip end thereof and the partitioning member 50. The valve spool 52 also defines a lower feedback chamber FL between the other tip end thereof and the bottom of the valve chamber 42L. Offset springs 60U and 60L are disposed within the upper and lower feedback chambers FU and FL, which offset springs exerts spring force to the valve spool 52 for resiliently restricting movement of the latter. Resilient force of the offset springs 60U and 60L are so set as to balance to place the valve spool 52 at a neutral position, when the fluid pressure in the upper and flow feedback chambers FU and FL balances to each other. The valve chamber 42L is communicated with a supply line 35 via an supply port 54s, a drain line 37 via a drain port 54r and a pressure control line 38 via a control port 54c which supply port, drain port and control port are defined in the valve housing 42. The valve spool 52 at the aforementioned neutral position, blocks fluid communication of the pressure control chamber PC with any of the supply port 54s and the drain port 54r. As a result, as long as the valve spool 52 is maintained at the neutral position, overall fluid force in the hydraulic circuit downstream of the pressure control valve, which circuit includes the working chamber 26d of the hydraulic cylinder 26 is held constant.

The valve spool 52 is formed with lands 52a and 52b connected to each other via smaller diameter bar-like section 52e. The land 52a is oriented adjacent the lower feedback chamber FL so as to subject the tip end to the fluid pressure in the lower feedback chamber. Similarly, the land 52b is oriented adjacent the upper feedback chamber FU so as to subject the tip end to the fluid pressure in the upper feedback chamber. The bar-like section 52e between the lands 52a and 52b is cooperative with the peripheral wall of the valve chamber 42L in order to define therebetween a pressure control chamber PC. A fluid flow path 52d is formed through the valve spool 52. The fluid flow path 52d has one end communicated with the pressure control chamber PC and the other end communicated with the lower feedback chamber FL. A fixed flow restricting orifice 52f is formed in the fluid flow path 52d for restricting fluid flow therethrough.

A poppet valve member 48 is disposed within the control chamber 42U for thrusting movement therein. The poppet valve member 48 has a valve head 48a of an essentially conical configuration. The valve head 48a opposes to the communication path opening 46A of the partitioning wall 46. The poppet valve member 48 is operably associated with a proportioning solenoid assembly 29 as the actuator. The proportioning solenoid assembly 29 comprises a housing 62 rigidly secured on the valve housing 42 and defining an internal space to receive therein a plunger 66. The plunger 66 has a plunger rod 66A. The tip end of the plunger rod 66A is kept in contact with the tip end of the poppet valve member 48 remote from the valve head 48a. Therefore, the poppet valve member 48 is axially driven by means of the plunger 66 to control the path area in the communication path opening 46A according to the position of the tip end of the plunger rod 66A. Adjusting of the path area in the communication path opening 46A results in variation of fluid pressure to be introduced into the pilot chamber PR.

In order to control the position of the plunger 66 with the plunger rod 66A, a proportioning solenoid coil 68 is housed within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure to be exerted on the poppet valve and the plunger so that the position of the tip end of the plunger rod 66A can be determined solely depending upon the magnitude of energization of the proportioning solenoid coil 68.

As seen from FIG. 2, the poppet valve member 48 has a cylindrical larger diameter section 48b for separating the control chamber 42U into upper section and lower section 42Uu and 42Ul. The upper and lower sections 42Uu and 42Ul are communicated with the drain port 54r via a pilot return path PT. A multi-stage orifice pr is provided in the pilot return path PT for restricting fluid flow therethrough. The multi-stage orifice Pr comprises a plurality of strips formed with through openings and is so designed that one of the orifice oriented at most upstream side is mainly effective for restricting fluid flow when fluid flowing therethrough is steady flow and that all of the orifices of respective strips are equally effective for restricting fluid flow when fluid flow therethrough is disturbed and not steady. Therefore, as will be appreciated herefrom, the multi-stage orifice Pr employed in the shown embodiment serves to provide greater fluid flow restriction against non-steady or disturbed fluid flow than that for the steady flow. As seen from FIG. 2, the multi-stage orifice Pr is provided upstream of the upper and lower sections 42Uu and 42Ul. On the other hand, a fixed throttling orifice Pd is provided at an orientation downstream of the lower section 42Ul and upstream of the upper section 42Uu. Similarly, the pilot chamber PR is communicated with the supply port 54s via a pilot path PP. A multi-stage orifice Qp which has similar construction and flow restricting function to that of the multi-stage orifice Pr is provided in the pilot path PP.

A fixed throttle orifice Pro is also provided in the drain port 54r for restricting fluid flow therethrough. The diameter of the fluid path at the orifice Pro is so selected as to create great flow restriction against pulsatile fluid flow cyclically varying the fluid pressure at a frequency approximately 1 Hz.

As can be seen from FIG. 2, the pressure control valve 28 is so arranged as to direct the axis of the valve bore 44 parallel to the longitudinal axis of the vehicle body. The longitudinal acceleration to be exerted on the vehicular body is much smaller than the lateral acceleration and vertical acceleration exerted on the vehicle body. Therefore, by arranging the pressure control valve 28 so that the poppet valve 48 and the valve spool 52 thrustingly move in longitudinal direction, influence of the externally applied acceleration can be minimized.

Figure 3:
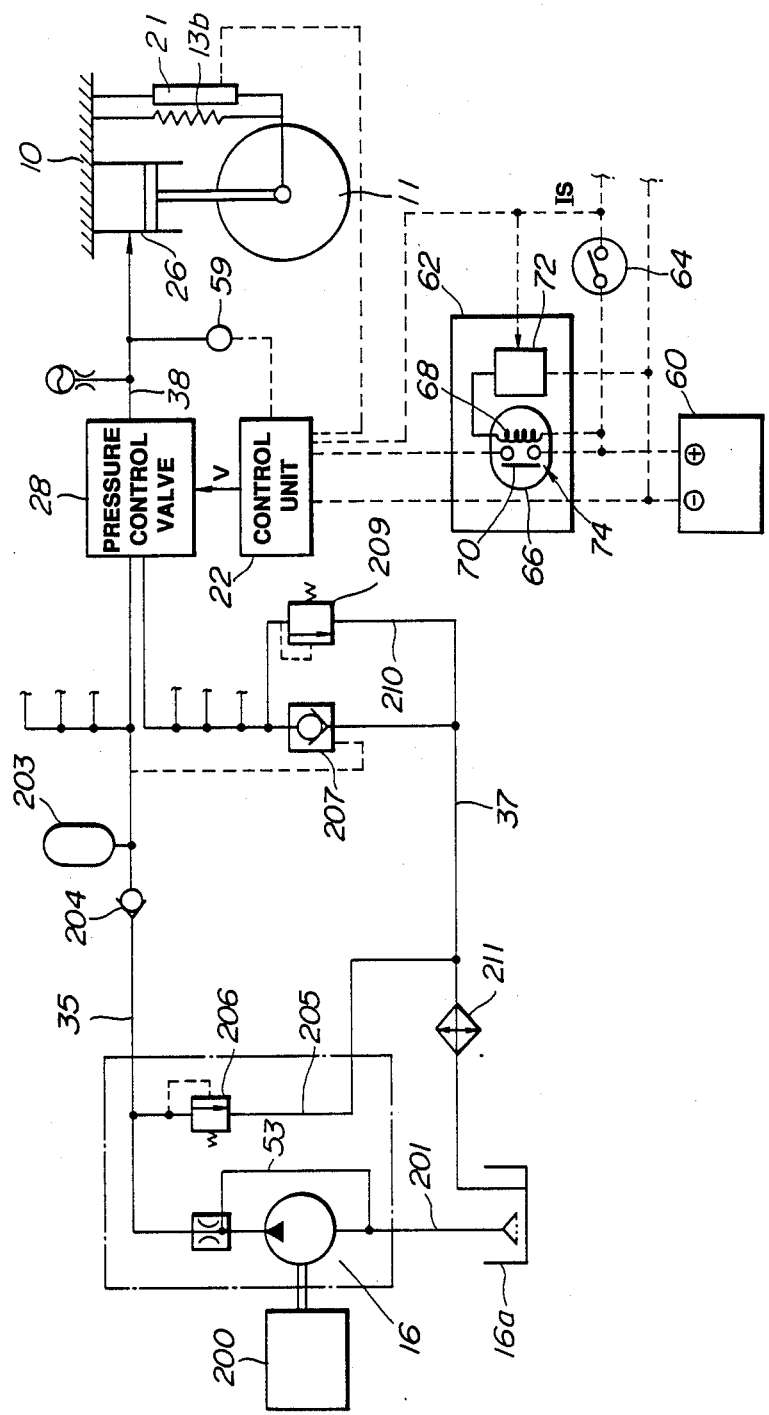
FIG. 3 is a circuit diagram of one example of hydraulic circuit which is applicable for the actively controlled suspension system according to the present invention.

FIG. 3 shows detailed circuit construction of one example of hydraulic circuit which is applicable for the shown embodiment of the actively controlled suspension system, according to the present invention. The pressure source unit includes the pressure unit 16 which comprises a fluid pump, and is connected to a fluid reservoir 16a via a suction pipe 201 the fluid pump 16 is associated with an automotive engine 200 so as to be driven by the output torque of the latter. The outlet of the pressure unit 16, through which the pressurized working fluid is discharged, is connected to the supply port 54s of the pressure control valve 28 via the supply line 35. A pressure regulating orifice 202 is disposed in the supply line 35 for suppressing pulsatile flow of the working fluid and whereby regulate the output pressure of the pressure unit 16 to be delivered to the pressure control valve 28. A feedback line 39 is connected to the upstream of the pressure regulating orifice 202 at one end. The other end of the feedback line 39 is connected to the upstream of the inlet of the pressure unit 16 and the orifice excessive fluid between the pressure unit 16 and the orifice 202 is fed back to the inlet side of the pressure unit.

A pressure accumulator 203 is also connected to the supply line 35 to receive therefrom the pressurized fluid for accumulating the pressure. An one-way check valve 204 is disposed in the supply line 35 at the position upstream of the junction between the pressure accumulator 203 and the supply line 35.

A pressure relief line 205 is also connected to the supply line 35 at the position intermediate between the pressure regulating orifice 202 and the one-way check valve 204, at one end. The other end of the pressure relief line 205 is connected to the drain line 37. A pressure relief valve 206 is disposed in the pressure relief line 205. The pressure relief valve 206 is responsive to the fluid pressure in the supply line 35 higher than a given value to drain port of the working fluid to the drain line for maintaining the pressure in the supply line 35 below the given pressure value.

On the other hand, a shut-off valve 207 is disposed in the drain line 37. The shut-off valve 207 is also connected to the supply line 35 at upstream of the one-way check valve 204 to receive therefrom the pressure in the supply line as a pilot pressure, via a pilot line 208. The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 37 may flow therethrough to the reservoir tank 16a. On the other hand, the shut-off valve 207 is responsive to the pilot pressure drops below the given pressure level to be switched into shut-off position. At the shut-off position, the shut-off valve blocks fluid communication between the drain port 54r of the pressure control valve 28 and the reservoir tank 16a.

In parallel to the shut-off valve 207. a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 37 upstream thereof, higher than a set pressure, e.g. 30 kgf/cm$^2$, in order to establish fluid communication between the upstream side and the downstream side of the shut-off valve 207 to allow the excessive pressure at the upstream side drain line 37 to be drained therethrough. Therefore, the pressure relief valve 209 limits maximum pressure at the set pressure. The set pressure of the pressure relief valve 209 corresponds to a predetermined offset pressure.

An oil cooler 211 is disposed in the drain line 37 for cooling the working fluid returning to the reservoir tank 16a.

In the hydraulic circuit set forth above, the fluid is pump 16 is driven by the engine 200 to discharge pressurized working fluid while the engine is running. The pressurized fluid discharged from the outlet of the fluid pump 16 is fed to the pressure control valve 28 via the supply line 35 including the pressure regulating orifice 202 and the one-way check valve 204. When the pressure control valve 28 is shifted to establish fluid communication between the supply port 54s and the pressure control port 54c from the valve position shown in FIG. 2, the pressurized working fluid passes the pressure control valve 28 and introduced into the working chamber 26d of the hydraulic cylinder 26. On the other hand, when the pressure control valve 28 is shifted to block fluid communication between the supply port 54s and the pressure control chamber PC, the fluid pressure in the supply line 35 increases. When the line pressure in the supply line 35 becomes higher than or equal to the set pressure of the pressure relief valve 206 in the pressure relief line 205, the excessive pressure is fed to the drain line 37 via the pressure relief valve 206 and thus returned to the reservoir tank 16a.

The fluid pressure in the supply line 35 is also fed to the shut-off valve 207 via a pilot line 208. As set forth, the shut-off valve 207 is placed at open position as long as the pilot pressure introduced through the pilot line 208 is held higher than or equal to the set pressure thereof. Therefore, fluid communication between the pressure control valve 28 and the reservoir tank 16a is maintained. At this position, the working fluid is thus returned to the reservoir tank 16a via the drain line 37 via the shut-off valve 207 and the oil cooler 211.

The shut-off valve 207, even at the open position, serves as a resistance to the fluid flow. Therefore, the fluid pressure in the drain line 37 upstream of the shut-off valve 207 becomes higher, i.e. higher than the offset pressure $P_O$. Then, the pressure relief valve 209 becomes active to open for allowing the excessive pressure of the working fluid to flow through the by-pass line 210.

When the engine stops, the pressure unit 16 ceases operation. By stopping the pressure unit 16, the working fluid pressure in the supply line 35 drops. According to drop of the pressure in the supply line 35, the pilot pressure to be exerted to the shut-off valve 207 via the pilot line 208 drops. When the pressure in the pilot line 208 drops below or equal to the set pressure, the shut-off valve 207 is switched into shut-off position to block fluid communication therethrough. As a results, the fluid pressure in the drain line 37 upstream of the shut-off valve 207 becomes equal to the pressure in the working chamber 26d. Therefore, even when the working fluid leaks through a gap between the spool valve 52 and the inner periphery of the valve bore, it is not affect the fluid pressure in the working chamber.

Figure 4:
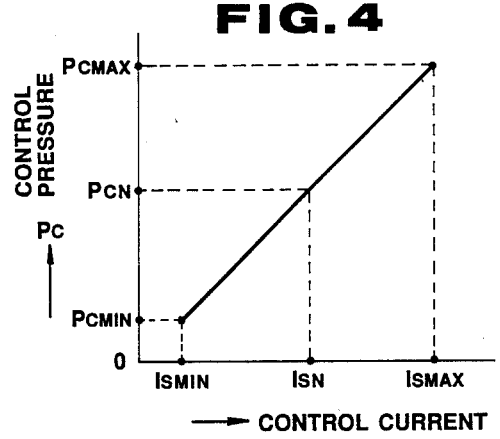
FIG. 4 is a chart showing relationship between an electric current value of a control signal to be supplied for an actuator of the pressure control valve and a working fluid pressure supplied to a working chamber of a hydraulic cylinder.

FIG. 4 shows variation of the working fluid pressure in the working chamber 26d of the hydraulic cylinder 26 according to variation of the current value of the control signal applied to the actuator 29 of the pressure control valve 28. As seen from FIG. 4, the hydraulic pressure in the working chamber 26d varies between a maximum pressure $P_{max}$ which is saturation pressure of the pressure source unit 16 and a minimum pressure $P_{min}$ which is set at a magnitude in view of a noise component to be contained in the control signal. As seen from FIG. 4, the maximum pressure $P_{max}$ corresponds to the maximum current value $I_{max}$ of the control signal and the minimum pressure $P_{min}$ corresponds to the minimum current value $I_{min}$ of the control signal. Furthermore, the hydraulic pressure level as labeled $P_n$ represents neutral pressure at the neutral current $I_n$. As seen, the neutral current $I_n$ is set at an intermediate value between the maximum and minimum current values $I_{max}$ and $I_{min}$.

Operation of the aforementioned pressure control valve 28 in terms of control of suspension characteristics and absorption of road shock will be discussed herebelow.

In general, the pressurized working fluid source unit 16 supplies the predetermined line pressure. For example, the line pressure in the supply line 35 may be set at a pressure of 80 kgf/cm$^2$.

When the vehicle steadily travels on a smooth straight road, the current value of the control signal to be applied to the actuator 29 of the pressure control valve 28 is maintained at the neutral value $I_n$. As long as the neutral value $I_n$ of the control signal is applied to the actuator 29, the proportioning solenoid coil 68 is energized at a magnitude corresponding the neutral value $I_n$ of the control signal to place the poppet valve 48 at the corresponding position. At this position, the flow resistance at the communication path opening 46A, path area of which is restricted by the valve head 48a of the poppet valve 48 becomes the neutral value. At this position of the poppet valve 48, the pilot pressure $P_p$ within the pilot chamber PR is maintained at the neutral pressure $P_n$. At this condition, if the fluid pressures is the control pressure Pc in the pressure control port 54c is held equal to the fluid pressure in the working chamber 26d of the hydraulic cylinder 26, the fluid pressure in the upper and lower feedback chambers FU and FL are held in balance to each other. The valve spool 52 is maintained at the neutral position to shut fluid communication between the supply port 54s the drain port 54r and the pressure control port 54c. Therefore, the control pressure Pc is maintained at the neutral pressure $P_n$.

At this condition, when relatively high frequency and small magnitude road shock input through the vehicular wheel, is absorbed by fluid communication between the working chamber 26d and the pressure accumulator 34 via the orifice 32. The flow restriction in the orifice 32 serves to absorb the bounding and rebounding energy. Therefore, high frequency and small magnitude road shock can be effectively absorbed so as not to be transmitted to the vehicle body.

When the piston 26c strokes in rebounding direction compressing the working chamber 26d, the fluid pressure in the working chamber increases to increase the control pressure Pc in the pressure control port 54c. Therefore, the control pressure Pc becomes higher than the pilot pressure Pp in the pilot chamber PR. This results in increasing of the fluid pressure in the lower feedback chamber FL at a magnitude higher than that in the upper feedback chamber FU. This causes upward movement of the valve spool 52 to establish fluid communication between the drain port 54r and the pressure control port 54c. Therefore, the pressure in the pressure control port 54c is drained through the drain line 37. This causes pressure drop at the pressure control port 54c so that the control pressure Pc becomes lower than the pilot pressure Pp in the pilot chamber PR. Then, the fluid pressure in the upper feedback chamber FU becomes higher than that in the lower feedback chamber FL. Therefore, the valve spool 52 is shifted downwardly to establish fluid communication between the supply port 54s and the pressure control port 54c. The pressurized working fluid in the supply line 35 is thus supplied to the working chamber 26d via the pressure control port 54c to increase the fluid pressure. By repeating the foregoing cycles, pressure balance is established between the pressure control port 54c and the pilot chamber PR. Therefore, the control pressure Pc as well as the fluid pressure in the working chamber 26d are adjusted to the pilot pressure.

During the pressure adjusting operation set forth above, the fixed throttling orifice Pro serves for restricting fluid flow from the pressure control port 54c to the drain line 37. This flow restriction at the orifice Pro serves as resistance against the rebounding stroke of the piston 26c to damp or absorb energy causing rebounding motion of the vehicle body. Furthermore, as set out, working fluid in the pilot chamber PR is generally introduced through the pilot path PP via the multi-stage orifice Qp and return through the pilot return path PT via the lower section 42U$l$ of the control chamber 42U and via the multi-stage orifice Pr. As long as the fluid flow in the pilot return path PT is not disturbed and thus steady. The most upstream side orifice Pr' is mainly effective for restricting the fluid flow. Therefore, magnitude of flow restriction is relatively small so as to provide sufficient response characteristics in reduction of the pilot pressure. On the other hand, when the working fluid flowing from the control chamber 42U confluence with the working fluid from the pilot chamber PR, back pressure is produced in the drain port 54r, the fluid flowing through the pilot return path PT is disturbed and thus becomes unstable. This tends to cause serving of the pressurized fluid from the drain port 54r to the pilot chamber PR. In such case, all of the orifices in the multi-stage orifice Pr is effective to create greater flow restriction that than for the steady flow. This avoid influence of the back pressure created in the drain port 54r.

Similarly, in response to the bounding stroke of the piston 26c the valve spool 52 is shifted up and down to absorb bounding energy and maintains the fluid pressure in the working chamber 26d of the hydraulic cylinder 26 at the neutral pressure.

On the other hand, when the anti-rolling suspension control is taken place in response to the lateral acceleration exerted on the vehicle body, the control signal current value is derived on the basis of the magnitude of the lateral acceleration monitored by the lateral acceleration sensor 23. Generally, in order to suppress rolling motion of the vehicular body, the fluid pressure in the working chamber 26d of the hydraulic cylinder 26 which is provided for the suspension mechanism at the side where the vehicular height is lowered across the neutral position, is increased to suppress lowering motion of the vehicle body. On the other hand, the fluid pressure in the working chamber 26d of the hydraulic cylinder 26 which is provided for the suspension mechanism at the side where the vehicular height is risen across the neutral position, is decreased to suppress rising motion of the vehicle body. Therefore, in order to control the pressures in the working chambers 26d of the both side hydraulic cylinders 26, control signal current values are increased and creased across the neutral value $I_n$.

For example, when rolling motion is caused by left turn of the vehicle, control current for the actuators 29 of the pressure control valves 28 controlling the fluid pressures in the front-right and rear-right hydraulic cylinders 26FR and 26RR are to be increased to be greater than the neutral current $I_n$, and the control current for the actuator of the pressure control valves 28 controlling the fluid pressures in the front-left and rear-left hydraulic cylinders 26FL and 26RL are to be decreased to be smaller than the neutral current $I_n$. By the control current supplied to respective actuators 29, the proportioning solenoid coils 68 are energized at the magnitudes corresponding to the control signal currents to place the poppet valves 48 at respective corresponding positions. By variation of the positions of the poppet valves 48, flow restriction magnitude at respective communication path openings 46A is varied to vary the pilot pressures Pp in the pilot chamber PR. As set forth, since the fluid pressures in the working chambers 26d become equal to the pilot pressures Pp, the suspension characteristics at respective hydraulic cylinders 26 can be adjusted.

Anti-pitching, bouncing suppressive suspension control can be performed substantially in the same manner to that discussed with respect to the anti-rolling control.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

As will be appreciated from the discussion given hereabove, the pressure control valve 28, according to the present invention, is so arranged as to direct the axis of the valve bore 44 parallel to the longitudinal axis of the vehicle body. The longitudinal acceleration to be exerted on the vehicular body is much smaller than the lateral acceleration and vertical acceleration exerted on the vehicle body. Therefore, by arranging the pressure control valve 28 so that the poppet valve 48 and the valve spool 52 thrustingly move in longitudinal direction, influence of the externally applied acceleration can be mimimized. Therefore, the objects and advantages can be successfully achieved.

What is claimed is:

1. An actively controlled suspension system comprising:

a cylinder disposed between a vehicle body and a suspension member rotatably supporting a road wheel, and defining a working chamber filled with a working fluid and variable of volume according to relative displacement between said vehicle body;

a fluid circuit including a fluid pressure source unit for supplying a pressurized working fluid through the circuit;

a pressure control valve assembly disposed in said fluid circuit for controlling fluid pressure in said working chamber, said pressure control valve having a movable valve member thrustingly movable along a thrusting axis for increasing pressure in said working chamber in a first mode and for decreasing the pressure in said working chamber in a second mode;

a valve position control means, associated with said valve member, controlling position of said valve member selectively in said first and second mode, said valve position control means deriving said valve position detecting upon vehicle driving condition; and said pressure control valve assembly being so arranged on said vehicle body for directing said thrusting axis with respect to the axis of the vehicle body for minimizing external force transferred through said vehicle body and to be exerted on said movable valve member of said pressure control valve.

2. An actively controlled suspension system comprising:

a cylinder disposed between a vehicle body and a suspension member rotatably supporting a road wheel, and defining a working chamber filled with a working fluid and variable of volume according to relative displacement between said vehicle body;

a fluid circuit including a fluid pressure source unit for supplying a pressurized working fluid through the circuit;

a pressure control valve assembly disposed in said fluid circuit for controlling fluid pressure in said working chamber, said pressure control valve having a movable valve member thrustingly movable along a thrusting axis for increasing pressure in said working chamber in a first mode and for decreasing the pressure in said working chamber in a second mode;

a valve position control means, associated with said valve member, controlling position of said valve member selectively in said first and second mode, said valve position control means deriving said valve position detecting upon vehicle driving condition; and said pressure control valve assembly being so arranged on said vehicle body for directing said thrusting axis parallel to a longitudinal axis of the vehicle body.

3. An actively controlled suspension system as set forth in claim 2, wherein said pressure control valve assembly comprises a housing defining a first port connected to a high pressure line in said fluid circuit for supply the pressurized fluid, a second port connected to a low pressure line in said fluid circuit for draining the pressurized fluid and a third port connected to said working chamber, said housing further defining a valve bore for receiving said valve spool in a fashion thrusting movable along said thrusting axis.

4. An actively controlled suspension system as set forth in claim 3, wherein said valve member thrusting movable across a predetermined neutral position, at which said valve member blocking fluid communication between said first port and said third port and between said second port and said third port.

5. An actively controlled suspension system as set forth in claim 4, wherein said pressure control valve assembly switching operation mode between said first mode and said second mode when said valve member moves across said neutral position.

6. An actively controlled suspension system as set froth in claim 5, said valve position control means controls position of said valve member with respect to said neutral position for varying for adjusting flow restriction for fluid flow from said first port to said third port in said first mode and from said third port to said second port in said second mode.

7. An actively controlled suspension system comprising:
- a cylinder disposed between a vehicle body and a suspension member rotatably supporting a road wheel, and defining a working chamber filled with a working fluid and variable of volume according to relative displacement between said vehicle body;
- a fluid circuit including a fluid pressure source unit for supplying a pressurized working fluid through the circuit;
- a pressure control valve assembly disposed in said fluid circuit for controlling fluid pressure in said working chamber, said pressure control valve having a movable valve member thrustingly movable along a thrusting axis for increasing pressure in said working chamber in a first mode and for decreasing the pressure in said working chamber in a second mode;
- a valve position control means, associated with said valve member, controlling position of said valve member selectively in said first and second mode, said valve position control means deriving said valve position detecting upon vehicle driving condition; and
- said pressure control valve assembly being so arranged on said vehicle body for orienting said thrusting axis in a direction perpendicular to directions of rolling force to be exerted on the vehicle body.

8. An actively controlled suspension system comprising:
- a cylinder disposed between a vehicle body and a suspension member rotatably supporting a road wheel, and defining a working chamber filled with a working fluid and variable of volume according to relative displacement between said vehicle body;
- a fluid circuit including a fluid pressure source unit for supplying a pressurized working fluid through the circuit;
- a pressure control valve assembly disposed in said fluid circuit for controlling fluid pressure in said working chamber, said pressure control valve having a movable valve member thrustingly movable along a thrusting axis for increasing pressure in said working chamber in a first mode and for decreasing the pressure in said working chamber in a second mode;
- a valve position control means, associated with said valve member, controlling position of said valve member selectively in said first and second mode, said valve position control means deriving said valve position detecting upon vehicle driving condition; and
- said pressure control valve assembly being so arranged on said vehicle body for orienting said thrusting axis perpendicular to a direction of vertical force for causing bounding and rebounding motion of the vehicle body.

* * * * *